US012677365B2

(12) United States Patent
Chen

(10) Patent No.: US 12,677,365 B2
(45) Date of Patent: Jul. 7, 2026

(54) LIGHT-EMITTING DIODE DRIVING CIRCUIT

(71) Applicant: PowerX Semiconductor Corporation, Hsinchu County (TW)

(72) Inventor: Te Cheng Chen, Hsinchu County (TW)

(73) Assignee: PowerX Semiconductor Corporation, Hsinchu County (TW)

( * ) Notice: Subject to any disclaimer, the term of this patent is extended or adjusted under 35 U.S.C. 154(b) by 40 days.

(21) Appl. No.: 19/002,754

(22) Filed: Dec. 27, 2024

(65) Prior Publication Data

US 2025/0220793 A1 Jul. 3, 2025

(30) Foreign Application Priority Data

Dec. 29, 2023 (TW) ................................ 112151728

(51) Int. Cl.

| | |
|---|---|
| ***H05B 45/345*** | (2020.01) |
| ***H05B 45/50*** | (2022.01) |
| ***H05B 47/155*** | (2020.01) |
| ***H05B 47/26*** | (2020.01) |

(52) U.S. Cl.

CPC ........... *H05B 45/50* (2020.01); *H05B 45/345* (2020.01); *H05B 47/155* (2020.01); *H05B 47/26* (2020.01)

(58) Field of Classification Search

CPC .... H05B 45/50; H05B 45/345; H05B 47/155; H05B 47/26

See application file for complete search history.

(56) References Cited

U.S. PATENT DOCUMENTS

| | | | | |
|---|---|---|---|---|
| 11,133,744 | B2 | 9/2021 | Kawata et al. | |
| 2009/0295776 | A1 | 12/2009 | Yu et al. | |
| 2013/0162150 | A1 * | 6/2013 | Masuda .............. | H05B 45/375 315/186 |

FOREIGN PATENT DOCUMENTS

| | | | |
|---|---|---|---|
| CN | 204559967 | U | 8/2015 |
| TW | 201110811 | A | 3/2011 |
| TW | 201208465 | A | 2/2012 |
| TW | 202243541 | A | 11/2022 |
| TW | M653795 | U | 4/2024 |

* cited by examiner

*Primary Examiner* — Henry Luong

(74) *Attorney, Agent, or Firm* — CKC & Partners Co., LLC

(57) ABSTRACT

A light-emitting diode driving circuit is electrically connected to the light-emitting diode array which includes a plurality of light strings. The light-emitting diode driving circuit includes a constant current source, a plurality of resistor, a detection circuit and a determination circuit. The constant current source is electrically connected between the light strings and the second current source and configured to control a driving current as a constant current. First terminals of the resistors are respectively connected to the light strings, and the second terminals of the resistors are connected to a reference voltage. The determination circuit is configured to output a failure determination signal.

20 Claims, 10 Drawing Sheets

LIGHT-EMITTING DIODE DRIVING CIRCUIT

CROSS-REFERENCE TO RELATED APPLICATION

This application claims priority to Taiwan Application Serial Number 112151728, filed Dec. 29, 2023, which is herein incorporated by reference in its entirety.

BACKGROUND

Field of Invention

The present invention relates to a light-emitting diode driving circuit. More particularly, the present invention relates to a light-emitting diode driving circuit with failure detection function for light-emitting diodes.

Description of Related Art

Nowadays, due to many advantages of light-emitting diodes, such as, fast response, low cost, etc., the light-emitting diodes are often used as a light source for a vehicle light. For driving safety, the luminous intensity of the vehicle light is usually restricted by regulations. However, light source components of the vehicle light are more prone to failure because of conditions of use, power supply voltages and other factors. In this case, if any one of the light-emitting diodes of the vehicle light is failure and the diving manner is unadjusted, the luminous intensity of the vehicle light could be inconsistent with regulations, or seriously affect driving safety.

Therefore, how to provide a light-emitting diode driving circuit capable for performing failure detection on light-emitting diodes is an important issue in this field.

SUMMARY

The present disclosure provides a light-emitting diode driving circuit. The light-emitting diode driving circuit is electrically connected to alight-emitting diode array. The light-emitting diode array comprises a plurality of light strings. Each of the light strings comprises a plurality of light-emitting diodes. The light strings are connected to a first current terminal to receive a driving current from the first current terminal. The light-emitting diode driving circuit comprises a constant current source, a plurality of resistors, a detection circuit and a determination circuit. The constant current source is electrically connected between the light strings and a second current terminal and configured to control the driving current as a constant current. The resistors include a plurality of first terminals and a plurality of second terminals. The first terminals of the resistors are electrically connected to the light strings, respectively. The second terminals of the resistors are electrically connected a reference voltage. The detection circuit is electrically connected to between the resistors and the light strings. The detection circuit comprises a plurality of diode units. Each of the diode units comprises a first diode and a second diode connected in series. The determination circuit comprises a first comparator and a second comparator. The first comparator comprises a first first input terminal electrically connected to the first diodes, a first second input terminal configured to receive a first floating voltage, and a first output terminal configured to output a first determination signal. The second comparator comprises a second first input terminal electrically connected to the second diodes, a second second input terminal configured to receive a second floating voltage, and a second output terminal configured to output a second determination signal. The first floating voltage and the second floating vary with the reference voltage.

The present disclosure provides another light-emitting diode driving circuit. The light-emitting diode driving circuit is electrically connected to a light-emitting diode array. The light-emitting diode array comprises a plurality of light strings. Each of the light strings comprises a plurality of light-emitting diode. The light strings are electrically connected to a first current terminal to receive a driving current from the first current terminal. The light-emitting diode driving circuit comprises a constant current source, a plurality of resistors, a detection circuit and a comparator. The constant current source is electrically connected between the light strings and a second current terminal and configured to control the driving current as a constant current. The resistors comprise a plurality of first terminals and a plurality of second terminals. The first terminals of the resistors are electrically connected to the light strings, respectively. The second terminals of the resistors are electrically connected to a reference voltage. The detection circuit is electrically connected between the resistors and the light strings. The detection circuit comprises a plurality of diodes. Anode terminals of the diodes are configured to receive a bias direct current. Cathode terminals of the diodes are electrically connected to the resistors, respectively. The comparator comprises a first input terminal electrically connected to the anode terminals of the diodes, a second input terminal configured to receive a floating voltage, and an output terminal configured to output a first determination signal. The floating voltage varies with the reference voltage.

The present disclosure provides another light-emitting diode driving circuit. The light-emitting diode driving circuit is electrically connected to a light-emitting diode array. The light-emitting diode array comprises a plurality of light strings. Each of the light strings comprises a plurality of light-emitting diodes. The light strings are electrically connected to a first current terminal to receive a driving current from the first current terminal. The light-emitting diode driving circuit comprises a constant current source, a plurality of resistors, a detection circuit and a comparator. The constant current source is electrically connected between the light strings and a second current terminal and configured to control the driving current as a constant current. The resistors comprise a plurality of first terminals and a plurality of second terminals. The first terminals of resistors are electrically connected to the light strings, respectively. The second terminals of the resistors are electrically connected to a reference voltage, respectively. The detection circuit is electrically connected between the resistors and the light strings. The detection circuit comprises a plurality of diodes. Cathode terminals of the diodes are configured to receive a bias direct current. Anode terminals of the diodes are electrically connected to the resistors. The comparator comprises a first input terminal electrically connected to the cathode terminals of the diodes, a second input terminal configured to receive a floating voltage, and an output terminal configured to output a determination signal. The floating voltage varies with the reference voltage.

Summary, the light-emitting diode driving circuit of the present disclosure includes a plurality of current branches, each electric branch includes a light string and a resistor electrically connected in series, and there is a diode electrically connected between the light string and the resistor included in each current branch. The aforesaid diode turns off or turns on the electrical path between the input terminal of the comparator and the electric current branch according to the voltage drop across the resistor included in each current branch, as such the comparator outputs the failure determination for detecting whether the element included in the light strings is failure.

BRIEF DESCRIPTION OF THE DRAWINGS

The present disclosure can be more fully understood by reading the following detailed description of the embodiment, with reference made to the accompanying drawings as follows.

DETAILED DESCRIPTION

Figure 1A:
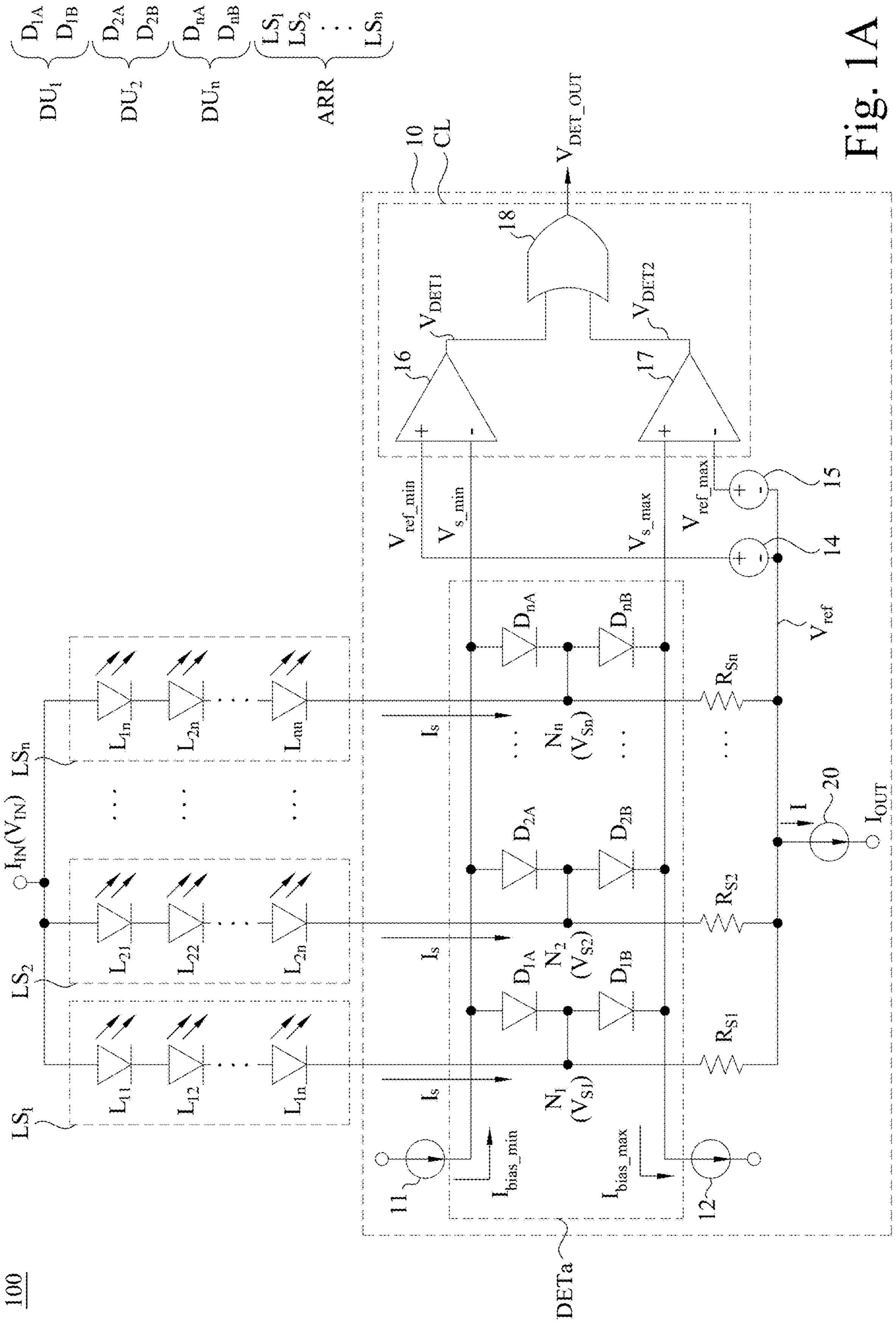
FIG. 1A shows a schematic diagram of a lighting system under a normal operating condition according to an embodiment of the present disclosure.

Reference will now be made in detail to embodiments of the present disclosure, examples of which are described herein and illustrated in the accompanying drawings. While the disclosure will be described in conjunction with embodiments, it will be understood that they are not intended to limit the disclosure to these embodiments. Description of the operation does not intend to limit the operation sequence. Any structures resulting from recombination of elements with equivalent effects are within the scope of the present disclosure. It is noted that, in accordance with the standard practice in the industry, the drawings are only used for understanding and are not drawn to scale. Wherever possible, the same reference numbers are used in the drawings and the description to refer to the same or like parts for better understanding.

In the description herein and throughout the claims that follow, unless otherwise defined, all terms have the same meaning as commonly understood by one of ordinary skill in the art to which this disclosure belongs. It will be further understood that terms, such as those defined in commonly used dictionaries, should be interpreted as having a meaning that is consistent with their meaning in the context of the relevant art and will not be interpreted in an idealized or overly formal sense unless expressly so defined herein. In the description herein and throughout the claims that follow, the terms "comprise" or "comprising," "include" or "including," "have" or "having," "contain" or "containing" and the like used herein are to be understood to be open-ended, i.e., to mean including but not limited to.

A description is provided with reference to FIG. 1A. FIG. 1A shows a schematic diagram of a lighting system 100 under a normal operating condition according to an embodiment of the present disclosure. In some embodiments, the lighting system 100 can be a vehicle light module for a heavy motorcycle. In another embodiment, the lighting system 100 can be a vehicle light module for an automobile, a light motorcycle, etc., however, the present disclosure does not intend to be limited thereto. In some embodiments, the lighting system 100 can be a brake light module. In some embodiments, the lighting system 100 can be a driving light. In the other embodiments, the lighting system 100 can be a head light, a tail light, a directional signal light, etc., however, the present disclosure does not intend to be limited thereto.

As shown in FIG. 1A, the lighting system 100 includes alight-emitting diode array ARR and a light-emitting diode driving circuit 10. In some embodiments, the light-emitting diode array ARR includes light-emitting diodes $L_{11}$~$L_{nn}$ arranged in an array. Furthermore, the light-emitting diode array ARR includes light strings $LS_1$~$LS_n$, and each of the light strings $LS_1$~$LS_n$ includes multiple light-emitting diodes electrically connected in series. Specifically, the light-emitting diodes $L_{11}$~$L_{1n}$ are electrically connected in series to form the light string $LS_1$, the light-emitting diodes $L_{21}$~$L_{2n}$ are electrically connected in series to form the light string $LS_2$, and so on. The light-emitting diodes $L_{n1}$~$L_{nn}$ are electrically connected in series to form the light string $LS_n$.

In some embodiments, the light-emitting diode array ARR is electrically connected to the light-emitting diode driving circuit 10. In some embodiments, the light-emitting diode driving circuit 10 includes a detection circuit DETa, a determination circuit CL and resistors $R_{S1}$~$R_{Sn}$. In some embodiments, the light strings $LS_1$~$LS_n$ included in the light-emitting diode array ARR are electrically connected in series with the correspondingly resistors $R_{S1}$~$R_{Sn}$ to form multiple current branches, respectively, and the foregoing current branches are connected in parallel between a first current terminal $I_{IN}$ and a second current terminal $I_{OUT}$. Specifically, the light string $LS_1$ and the resistor $R_{S1}$ are electrically connected in series between the first current terminal $I_{IN}$ and the second current terminal $I_{OUT}$, the light string $LS_2$ and the resistor $R_{S2}$ are electrically connected in series between the first current terminal $I_{IN}$ and the second current terminal $I_{OUT}$, and so on. The light string $LS_n$ and the resistor $R_{Sn}$ are electrically connected in series between the first current terminal $I_{IN}$ and the second current terminal $I_{OUT}$. In some embodiments, the first current terminal $I_{IN}$ can be considered as a current input terminal of the lighting system 100, and the second current terminal $I_{OUT}$ can be considered as a current output terminal of the lighting system 100.

In some embodiments, first terminals of the light strings $LS_1$~$LS_n$ are electrically connected to the first current terminal $I_{IN}$ and receive a driving current I (which is only represented near the second current terminal $I_{OUT}$) from the first current terminal $I_{IN}$. In some embodiments, first terminals of the resistors $R_{S1}$~$R_{Sn}$ are electrically connected to second terminals of the light strings $LS_1$~$LS_n$ respectively, and second terminals of the resistors $R_{S1}$~$R_{Sn}$ are electrically connected to the second current terminal $I_{OUT}$ through a constant current source 20. To be noted that, each of the light strings $LS_1$~$LS_n$ of the present disclosure includes two terminals, in which when the first terminal (such as, a terminal near the first current terminal $I_{IN}$) is an anode terminal (/a cathode terminal), the second terminal (such as, the other terminal near the resistors $R_{S1}$~$R_{Sn}$) is a cathode terminal (/an anode terminal). In some embodiments, the driving current I flows from the first current terminal $I_{IN}$ to the second current terminal $I_{OUT}$ through the current branches composed of the light strings $LS_1$~$LS_n$ and the resistors $R_{S1}$~$R_{Sn}$. In other words, the driving current I is separated at the first current terminal $I_{IN}$ to multiple currents $I_S$ which flow to the second current terminal $I_{OUT}$ respectively through the current branches composed of the light strings $LS_1$~$LS_n$ and the resistors $R_{S1}$~$R_{Sn}$ and further through the constant current source 20. Under ideal conditions, for example, one of the light strings $LS_1$~$LS_n$ has the same specifications and the same number of light-emitting diodes as the other strings $LS_1$~$LS_n$, and the currents $I_S$ flowing through the current branches are substantially the same to each other.

In some embodiments, the constant current source 20 is electrically connected between the light strings $LS_1$~$LS_n$ and the second current terminal $I_{OUT}$. In some embodiments, the constant current source 20 is electrically connected to the current path of the driving current I. In some embodiments, the constant current source 20 is configured to generate a constant output current. That is, the constant current source 20 is configured to control the driving current I as a constant current.

In some embodiments, the detection circuit DETa is electrically connected between the resistors $R_{S1}$~$R_{Sn}$ and the light strings $LS_1$~$LS_n$, for example, through nodes $N_1$~$N_n$. In some embodiments, the detection circuit DETa includes diode units $DU_1$~$DU_n$. In some embodiments, each of the diode units $DU_1$~$DU_n$ includes two diodes, for example, the diode unit $DU_1$ includes diodes $D_{1A}$ and $D_{1B}$, and so on. The diode unit $DU_n$ includes diode $D_{nA}$ and $D_{nB}$. In some embodiments, cathode terminals of the diodes $D_{1A}$~$D_{nA}$ are electrically connected to first terminals of the resistors $R_{S1}$~$R_{Sn}$ respectively (that is, the cathode terminals of the diodes $D_{1A}$~$D_{nA}$ are electrically connected to the nodes $N_1$~$N_n$ respectively), and anode terminals of the diodes $D_{1A}$~$D_{nA}$ are electrically connected to the determination circuit CL. In some embodiments, anode terminals of the diodes $D_{1B}$~$D_{nB}$ are electrically connected to the first terminals of the resistors $R_{S1}$~$R_{Sn}$ through the nodes $N_1$~$N_n$ respectively, and cathode terminals of the diodes $D_{1A}$~$D_{nA}$ are respectively electrically to the determination circuit CL. In some embodiments, the diodes $D_{1A}$~$D_{nA}$ and $D_{1B}$~$D_{nB}$ can be implemented by P-N junction diodes. In some embodiments, the diodes $D_{1A}$~$D_{nA}$ and $D_{1B}$~$D_{nB}$ can be implemented by Zener diodes. In some embodiments, the diodes $D_{1A}$~$D_{nA}$ and $D_{1B}$~$D_{nB}$ can be implemented by Schottky diodes. Generally, a Schottky diode has a voltage drop which is about or less than 0.2 volts, a voltage error which is low when it is applied, and further deviation which is small under high and low temperature conditions.

In some embodiments, the determination circuit CL includes comparators 16~17 and an OR gate 18. In some embodiments, a first input terminal of the comparator 16 (such as, an inverting input terminal, which is illustrated as "-" in drawings) is electrically connected to the anode terminals of the diodes $D_{1A}$~$D_{nA}$, and a second input terminal of the comparator 16 (such as, a non-inverting input terminal, which is illustrated as "+" in drawings) is configured to receive a floating voltage $V_{ref\_min}$. In some embodiments, a first input terminal of the comparator 17 (such as, a non-inverting input terminal) is electrically connected to the cathode terminals of the diodes $D_{1B}$~$D_{nB}$, and a second input terminal (such as, an inverting input terminal) of the comparator 17 is configured to receive a floating voltage $V_{ref\_max}$.

In some embodiments, the second input terminal of the comparator 16 is electrically connected to a floating voltage source 14 to receive the floating voltage $V_{ref\_min}$ provided by the floating voltage source 14. In some embodiments, a second terminal (such as, a negative electrode) of the floating voltage source 14 is electrically connected to a reference voltage $V_{ref}$. In some embodiments, since the driving current I is controlled as a constant current, if the voltage $V_{IN}$ at the first current terminal $I_{IN}$ floats, any one voltage on the current path of the driving current I floats, accordingly. That is, the reference voltage $V_{ref}$ floats or varies with the voltage $V_{IN}$ at the first current terminal $I_{IN}$. Accordingly, by coupling the second terminal of the floating voltage source 14 to the reference voltage $V_{ref}$, the floating voltage $V_{ref\_min}$ is equal to the sum of a fixed voltage difference provided by the floating voltage source 14 and the reference voltage $V_{ref}$, and the value of the floating voltage $V_{ref\_min}$ can exactly vary in response to the variation of the voltage $V_{IN}$ at the first current terminal $I_{IN}$. Therefore, in a case where the voltage $V_{IN}$ at the first current terminal $I_{IN}$ varies, the comparison result generated by the comparator 16 may not become meaningless when the second terminal of the comparator 16 receives a incorrect baseline for comparison. By contrast, the floating voltage source 14 is grounded in related technologies, and the comparison result is affected by the variation of the voltage at the input terminal. In contrast to this, the determination result of the present disclosure is not affected by the variation of the voltage $V_{IN}$ at the first current terminal $I_{IN}$.

In some embodiments, the second input terminal of the comparator 17 is electrically connected to a floating voltage source 15 to receive the floating voltage $V_{ref\_max}$ provided by the floating voltage source 15. In some embodiments, a second terminal (such as, a negative electrode) of the floating voltage source 15 is electrically connected to the reference voltage $V_{ref}$. In some embodiments, since the driving current I is controlled as a constant current, if the voltage $V_{IN}$ at the first current terminal $I_{IN}$ floats, any one voltage on the current path of the driving current I floats, accordingly. That is, the reference voltage $V_{ref}$ floats or varies with the voltage $V_{IN}$ at the first current terminal $I_{IN}$. Accordingly, by coupling the second terminal of the floating voltage source 15 to the reference voltage $V_{ref}$, the floating voltage $V_{ref\_max}$ is equal to the sum of a fixed voltage difference provided by the floating voltage source 15 and the reference voltage $V_{ref}$, and the value of the floating voltage $V_{ref\_max}$ can exactly vary in response to the voltage $V_{IN}$ at the first current terminal $I_{IN}$. Therefore, in a case where the voltage $V_{IN}$ at the first current terminal $I_{IN}$ varies, the comparison result generated by the comparator 17 will not become meaningless when the second terminal of the comparator 17 receives an incorrect baseline for comparison. By contrast, the floating voltage source 15 is grounded in related technologies, and the comparison result is affected by the variation of the voltage at the input terminal. In contrast to this, the determination result of the present disclosure is not affected by the variation of the voltage $V_{IN}$ at the first current terminal $I_{IN}$.

In some embodiments, a bias current source 11 is electrically connected to the anode terminals of the diodes $D_{1A}$~$D_{nA}$ and the first input terminal of the comparator 16. In some embodiments, the bias current source 11 is configured to provide a bias current $I_{bias\_min}$, such that the states of the diode $D_{1A}$~$D_{nA}$ operate at the operating point to maintain a basic operation. In some embodiments, the bias current $I_{bias\_min}$ is within a range of 0.5 mA~1.5 mA. In other embodiments, the bias current $I_{bias\_min}$ can be implemented by a current that is smaller than 0.5 mA or greater than 1.5 mA. In some embodiments, an open-circuit failure detection circuit is composed of the diodes $D_{1A}$~$D_{nA}$, the resistors $R_{S1}$~$R_{Sn}$ and the comparator 16. How to operate the open-circuit failure detection circuit will be described in detailed in the following embodiments.

In some embodiments, the bias current source 12 is electrically connected to the cathode terminals of the diodes $D_{1B}$~$D_{nB}$ and the first input terminal of the comparator 17. In some embodiments, the bias current source 12 is configured to provide a bias current $I_{bias\_max}$, such that the states of the diodes $D_{1B}$~$D_{nB}$ operate at the operating point. In some embodiments, the bias current $I_{bias\_max}$ is within a range of 0.5 mA~1.5 mA. In the other embodiments, the bias current $I_{bias\_max}$ can be implemented by a current that is smaller than 0.5 mA or greater than 1.5 mA. In the other embodiments, a short-circuit failure detection circuit is composed of the diodes $D_{1B}$~$D_{nB}$, the resistors $R_{S1}$~$R_{Sn}$ and the comparator 17. How to operate the short-circuit failure detection circuit will be described in detailed in the following embodiments.

Figure 1B:
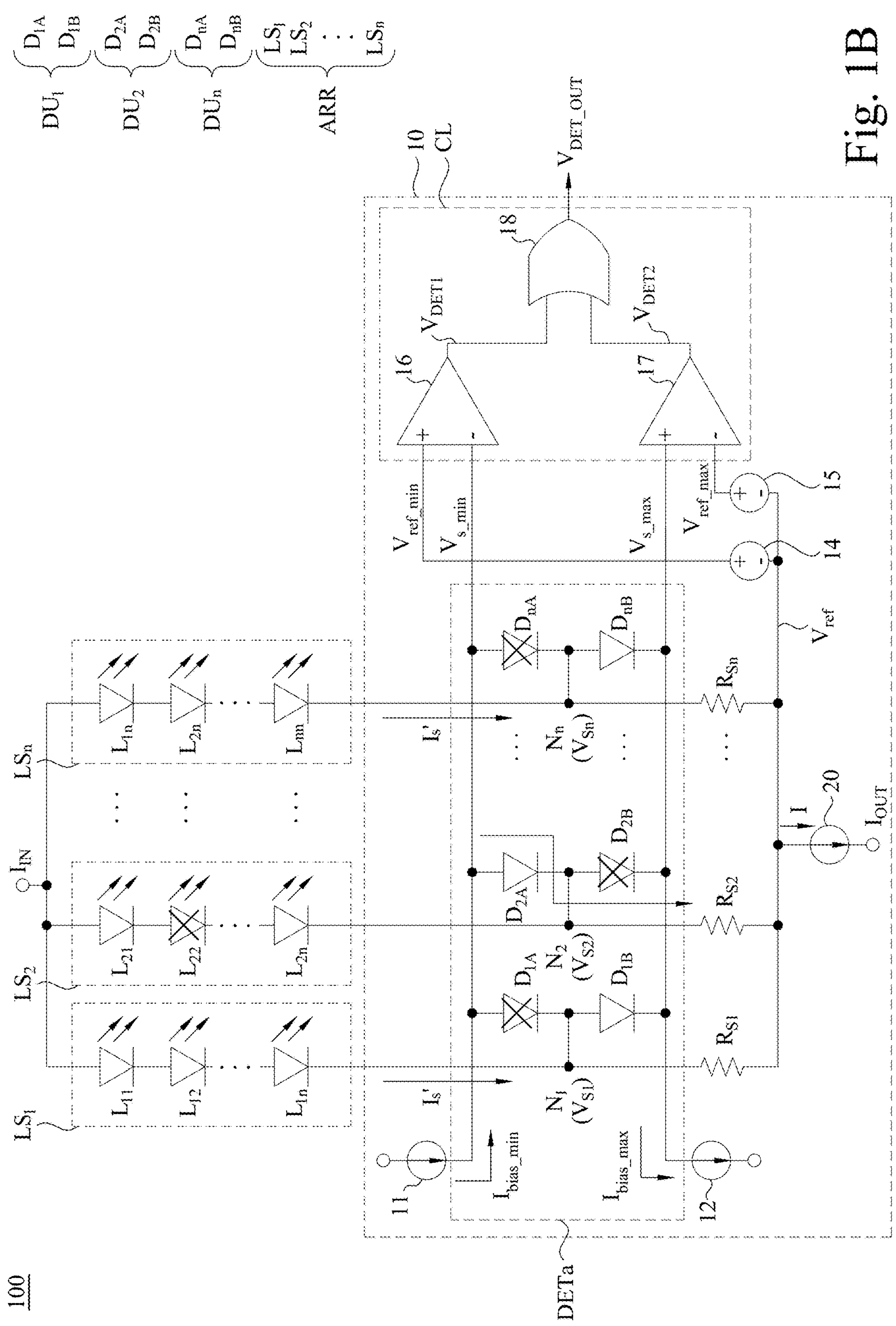
FIG. 1B shows a schematic diagram of an operation when a light-emitting diode included in a lighting system is under an open-circuit failure condition according to an embodiment of the present disclosure.

For better illustrates the operation of the open-circuit failure detection under the normal operating condition and the open-circuit failure condition, a description is provided with reference to FIG. 1A. and FIG. 1B. FIG. 1B shows a schematic diagram of an operation when the light-emitting diode $L_{22}$ included in the lighting system 100 is under the open-circuit failure condition according to an embodiment of the present disclosure. In some embodiments, for a case where the light strings $LS_1$~$LS_n$ are under the normal operating condition and a case where the light-emitting diode $L_{22}$ is under the open-circuit failure condition, the voltages $V_{S1}$~$V_{Sn}$ at the nodes $N_1$~$N_n$ and the voltage $V_{s\_min}$ at the inverting input terminal of the comparator 16 can be given by the following Table 1.

TABLE 1

| | $V_{S1}$ | $V_{S2}$ | . . . $V_{Sn}$ | $V_{s\_min}$ |
|---|---|---|---|---|
| normal operating condition | $I_s$*$R_S$ | $I_s$*$R_S$ | . . . $I_s$*$R_S$ | [$I_s$*$R_S$ + $V_{DA}$] |
| $L_{22}$ under open-circuit failure condition | $I_s$'*$R_S$ | 0 | . . . $I_s$'*$R_S$ | [0 + $V_{DA}$] |

In Table 1, the voltage at the second terminal of the resistor $R_{S2}$ is assumed to be 0 volts. The term "$R_S$" indicates to a resistance of each of the resistors $R_{S1}$~$R_{Sn}$, and the term "$V_{DA}$" indicates to a voltage drop of each of the diodes $D_{1A}$~$D_{nA}$. In some embodiments, when the light-emitting diodes $L_{11}$-$L_{nn}$ included in the light strings $LS_1$~$LS_n$ are under the normal operating condition, the voltage drops across the aforementioned current branches are the same, such that the amplitudes of the currents $I_s$ flowing through the current branches are the same. In some embodiments, the light strings $LS_1$~$LS_n$ have the same number of light-emitting diodes, and these light-emitting diodes have the same specification. In some embodiments, the resistances of the resistors $R_{S1}$~$R_{Sn}$ are the same, and the diodes $D_{1A}$~$D_{nA}$ have the same specification. In some embodiments, when the light strings $LS_1$~$LS_n$ operate normally, each of the currents flowing through the light strings $LS_1$~$LS_n$ can be given by (I/n), and the voltages $V_{S1}$~$V_{Sn}$ are voltages across the resistors $R_{S1}$~$R_{Sn}$ respectively, which could be given by (I/n)*$R_{Sn}$, where the term "I" indicates the amplitude of the driving current, the term "n" indicates the number of light strings $LS_1$~$LS_n$, and the term "$R_{Sn}$" indicates the resistance of each of the resistors $R_{S1}$~$R_{Sn}$. As shown in FIG. 1A, when the light strings $LS_1$~$LS_n$ operate normally, the amplitudes of the currents $I_S$ flowing though the light strings $LS_1$~$LS_n$ are the same substantially, and a voltage across two terminals of each of the diodes $D_{1A}$~$D_{nA}$ remains at a certain voltage (that is the voltage drop across the diode, such as 0.7 volts). The voltage $V_{s\_min}$ at the inverting input terminal of the comparator 16 can be given by [$I_s$*$R_S$+$V_{DA}$], where the term "$R_S$" indicates the resistance of each of the resistors $R_{S1}$~$R_{Sn}$, and the term "$V_{DA}$" indicates the voltage drop of each of the diodes $D_{1A}$~$D_{nA}$. In some embodiments, if the diodes $D_{1A}$~$D_{nA}$ are implemented by Schottky diodes, which have small voltage drops, [$I_s$*$R_S$+$V_{DA}$] can approximate [$I_s$*$R_S$]. In some embodiments, the signals coupled to the two input terminals of the comparator 16 can be exchanged. That is, the first input terminal of the comparator 16 is coupled to the floating voltage $V_{ref\_min}$, the second input terminal thereof is coupled to the voltage $V_{s\_min}$, and when the output terminal of the comparator 16 outputs a signal with a low logic level, it is determined that there is an open-circuit failure occurs in the lighting system 100.

In some embodiments, the floating voltages $V_{ref\_min}$ and $V_{ref\_max}$ are default values, and these two default voltage values may be set as upper and lower limit values based on the median value of the voltages $V_{S1}$~$V_{Sn}$. When any one of the voltages $V_{s\_min}$ and $V_{s\_max}$ exceeds the range between the upper and lower limit values, which means that there is open-circuit or short-circuit failure occur in one or more light-emitting diode. A difference between this upper or lower limit value and the median value of the voltages $V_{S1}$~$V_{Sn}$ depends on the voltage drop of a single light-emitting diode and the distribution range thereof, which usually can be within a range of 0.4 volts~2.6 volts.

As shown in FIG. 1B, when the light-emitting diode $L_{22}$ included in the light string $LS_2$ is under the open-circuit failure condition, the current flowing through the light string $LS_2$ is reduced to nearly zero (that is, there is substantially no current flowing through the light string $LS_2$), and the currents $I_s$' flowing through the other light strings are slightly increased. Meanwhile, the voltage across the resistor $R_{S2}$ is decreased or equal to 0 volts, that is, the voltage ($V_{S2}$) at the node $N_2$ is zero, such that the diode $D_{2A}$ is in a turn-on state to form a current path between the inverting input terminal of the comparator 16 and the resistor $R_{S2}$ (for example, if the diode $D_{2A}$ is a Schottky diode, the conduction voltage of the diode $D_{2A}$ is about or less than 0.2 volts, which has low deviation under high and low temperature conditions, and the bias current $I_{bias\_min}$ provided by the bias current source 11 is enough to turn on the diode $D_{2A}$), so as to decrease a voltage at the inverting input terminal of the comparator 16, and the diode $D_{2B}$ is in a turn-off state. Therefore, a current path between the non-inverting input terminal of the comparator 17 and the resistor $R_{S2}$ is interrupted, such that the voltage $V_{s\_min}$ at the inverting input terminal of the comparator 16 is decreased or equal to the voltage at the first terminal of the resistor $R_{S2}$ (that is, the voltage ($V_{S2}$) at the node $N_2$). Then, the voltage $V_{s\_min}$ is compared with the floating voltage $V_{ref\_min}$. When the voltage $V_{s\_min}$ is less than the floating voltage $V_{ref\_min}$, the comparator 16 outputs the determination signal $V_{DET1}$ with a high logic level.

Continuing from the above description, when at least one light-emitting diode (such as, the light-emitting diode $L_{22}$) included in the light strings $LS_1$~$LS_n$ is under the open-circuit failure condition, the comparator 16 outputs the determination signal $V_{DET1}$ with the high logic level. Therefore, the determination signal $V_{DET1}$ with the high logic level indicates that at least one light-emitting diode included in the light strings $LS_1$~$LS_n$ is under the open-circuit failure condition, and the determination signal $V_{DET1}$ with the low logic level indicates that there is no open-circuit failure occurring in the light-emitting diodes $L_{11}$~$L_{nn}$. That is, the determination signal $V_{DET1}$ is configured to provide open-circuit information about the light-emitting diodes $L_{11}$~$L_{nn}$.

In some embodiments, when the light-emitting diode $L_{22}$ is under the open-circuit failure condition, voltages at the first terminals of the diodes $D_{1A}$ and $D_{nA}$ are less than voltages at the second terminals thereof (for example, the voltage at the first terminal of the diode $D_{nA}$ is equal to the voltage at the node $N_2$, which is substantially equal to 0). Therefore, each of the diodes $D_{1A}$~$D_{nA}$ excluding the diode $D_{2A}$ is in the turn-off state. In some embodiments, when the light-emitting diode $L_{22}$ is under the open-circuit failure condition, a voltage at the first terminal of the diode $D_{2B}$ (the voltage $V_{S2}$ at the node $N_2$) is not greater than a voltage at the second terminal of the diode $D_{2B}$, and therefore the diode $D_{2B}$ is in the turn-off state. In some embodiments, when the light-emitting diode $L_{22}$ is under the open-circuit failure condition, a voltage across two terminals of each of the diodes $D_{1B}$~$D_{nB}$ excluding the diode $D_{2B}$ remains at a certain voltage (that is, the voltage drop of the general diode which is 0.7 volts, or the voltage drop of the Zener diode which is 0.1 volts), such that the voltage $V_{s\_max}$ at the non-inverting input terminal of the comparator 17 can be given by $[I_s'*R_S-V_{DB}]$, where the term "$V_{DB}$" indicates a voltage drop of each of the diodes $D_{1B}$~$D_{nB}$. In some embodiments, if at least one of the light-emitting diode (such as, the light-emitting diode $L_{22}$) included in the light strings $LS_1$~$LS_n$ is under the open-circuit failure condition, the comparator 17 outputs the determination signal $V_{DET2}$ with a low logic level.

In some embodiments, when all of the light strings $LS_1$~$LS_n$ operate normally, the OR gate 18 outputs the failure determination signal $V_{DET\_OUT}$ with a low logic level according to the determination signals $V_{DET1}$ and $V_{DET2}$. On the other hand, when at least one of the light-emitting diode (such as, the light-emitting diode $L_{22}$) included in the light strings $LS_1$~$LS_n$ is under the open-circuit failure condition, the OR gate 18 outputs the failure determination signal $V_{DET\_OUT}$ with a high logic level according to the determination signals $V_{DET1}$ and $V_{DET2}$.

Figure 1C:
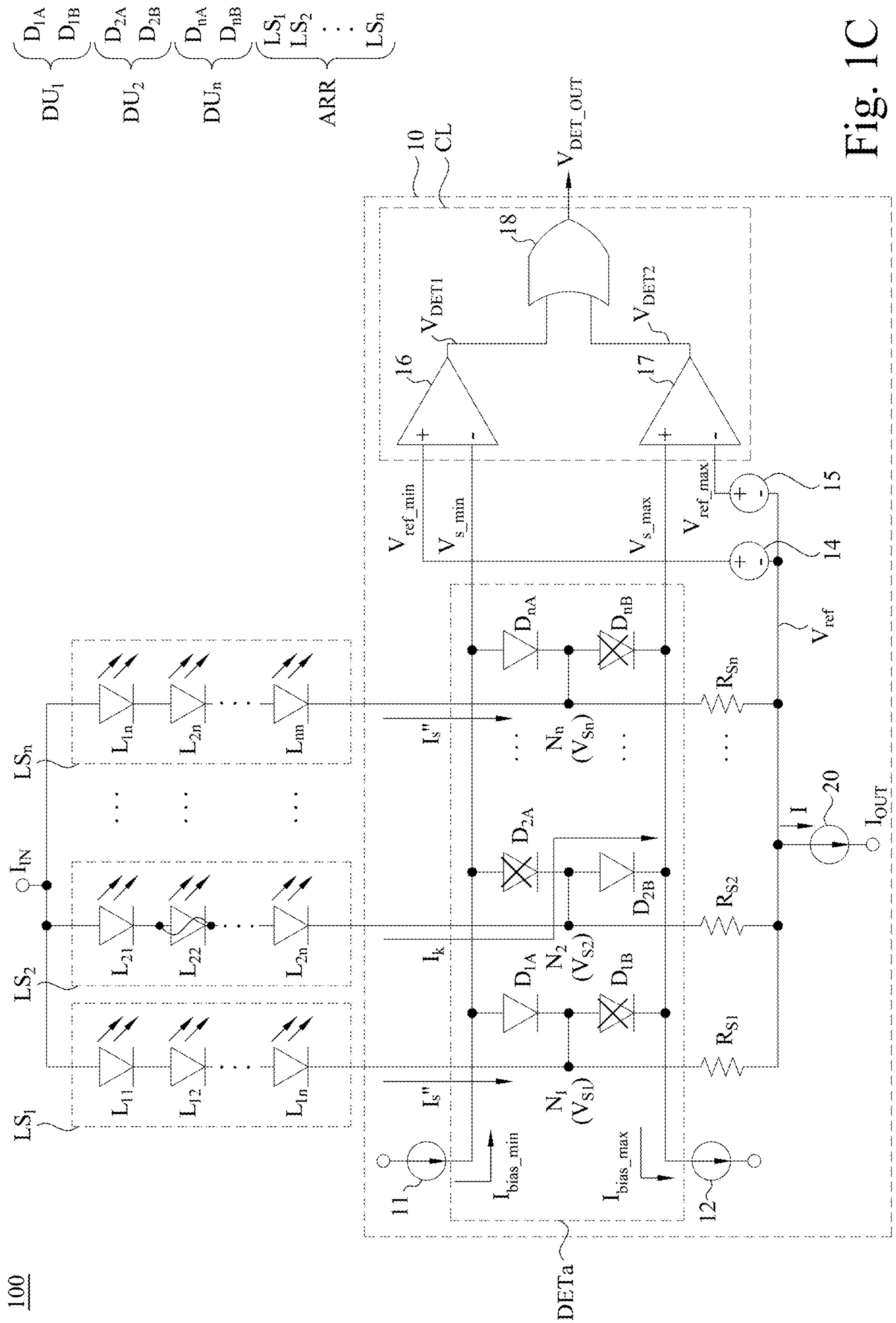
FIG. 1C shows a schematic diagram of an operation when a light-emitting diode included in a lighting system is under a short-circuit failure condition according to an embodiment of the present disclosure.

For better illustration of the short-circuit failure detection under a normal operating condition and a short-circuit failure condition, a description is provided with reference to FIG. 1A. and FIG. 1C. FIG. 1C shows a schematic diagram of an operation when a light-emitting diode $L_{22}$ included in the lighting system 100 is under a short-circuit failure condition according to an embodiment of the present disclosure. In some embodiments, for a case where the light string $LS_1$~$LS_n$ are under normal operating condition and a case where the light emitting diode $L_{22}$ under the short-circuit failure condition, the voltages $V_{S1}$~$V_{Sn}$ at the nodes $N_1$~$N_n$, the voltage $V_{s\_max}$ at the non-inverting input terminal of the comparator 17 can be given by the following Table 2.

TABLE 2

| | $V_{S1}$ | $V_{S2}$ | . . . | $V_{Sn}$ | $V_{s\_max}$ |
|---|---|---|---|---|---|
| normal operating condition | $I_s*R_S$ | $I_s*R_S$ | . . . | $I_s*R_S$ | $[I_s*R_S - V_{DB}]$ |
| $L_{22}$ under short-circuit failure condition | $I_s''*R_S$ | $I_k*R_S$ | . . . | $I_s''*R_S$ | $[I_k*_{RS} - V_{DB}]$ |

In Table 2, the voltage at the second terminal of the resistor $R_{S2}$ is assumed to be 0 volts. The term "$R_S$" indicates to the resistance of each of the resistors $R_{S1}$~$R_{Sn}$, and the term "$V_{DB}$" indicates to the conduction voltage of each of the diodes $D_{1B}$~$D_{nB}$. In some embodiments, when all of the light-emitting diodes $L_{11}$~$L_{nn}$ included in the light strings $LS_1$~$LS_n$ are under the normal operating condition, the voltage drops across the aforementioned current branches are the same, such that the amplitudes of the currents $I_s$ flowing through the current branches are the same. In some embodiments, the light strings $LS_1$~$LS_n$ have the same number of light-emitting diodes, and these light-emitting diodes have the same specification. In some embodiments, the resistances of the resistors $R_{S1}$~$R_{Sn}$ are the same, and the diodes $D_{1B}$~$D_{nB}$ the have the same specification.

As shown in FIG. 1A, when the light strings $LS_1$~$LS_n$ operate normally, the amplitudes of the currents $I_S$ flowing through the light strings $LS_1$~$LS_n$ are substantially the same, a voltage across two terminals of each of the diodes $D_{1B}$~$D_{nB}$ remains at a certain voltage (e.g., the voltage drop of a diode, such as, 0.7 volts), such that the voltage $V_{s\_max}$ at the non-inverting input terminal of the comparator 17 can be given by $[I_s*R_S-V_{DB}]$, where the term "$R_S$" indicates to the resistance of each of the resistors $R_{S1}$~$R_{Sn}$, and the term "$V_{DB}$" indicates to the voltage drop of each of the diodes $D_{1B}$~$D_{nB}$. In some embodiments, the floating voltage $V_{ref\_max}$ is set based on $[I_s*R_S-V_{DB}]$, such that the comparator 17 outputs a signal with the low logic level when the light strings $LS_1$~$LS_n$ operate normally. For example, the floating voltage $V_{ref\_max}$ is set to be larger than $[I_s*R_S-V_{DB}]$, such that the voltage $V_{s\_max}$ at the non-inverting input terminal of the comparator 17 is less than the floating voltage $V_{ref\_max}$ when the light strings $LS_1$~$LS_n$ operate normally. In some embodiments, in a case where the diodes $D_{1A}$~$D_{nA}$ are implemented by Schottky diodes, which have low voltage drops, the expression of $[I_s*R_S-V_{DB}]$ can be considered as $[I_s*R_S]$. In some embodiments, the signals coupled by two input terminals of the comparator 17 can be exchanged, that is, the input first terminal of the comparator 17 is coupled to the floating voltage $V_{ref\_max}$, and the second input terminal thereof is coupled to the voltage $V_{s\_max}$. In this case, when the output terminal of the comparator 17 outputs a signal with the low logic level, it is determined that there is a short-circuit failure event occurring in the lighting system 100.

As shown in FIG. 1C, when the light-emitting diode $L_{22}$ included in the light string $LS_2$ is under the short-circuit failure condition, the current $I_k$ flowing through the light string $L_{22}$ is increased (this is because an equivalent resistance of light string $LS_2$ is less than the other light strings), and the currents $I_s''$ flowing through the other light strings are reduced. Meanwhile, the voltage at the node $N_2$ is increased, the diode $D_{2B}$ is in a turn-on state to form a current path between the first terminal of the resistor $R_{S2}$ and the non-inverting input terminal of the comparator 17, and the diode $D_{2A}$ is in a turn-off state to interrupt a current path between the first terminal of the resistor $R_{S2}$ and the inverting input terminal of the comparator 16, such that the voltage at the non-inverting input terminal of the comparator 17 is increased to the voltage at the first terminal of the resistor $R_{S2}$, which is larger than the floating voltage $V_{ref\_max}$. Therefore, and the comparator 17 outputs the determination signal $V_{DET2}$ with a high logic level. In some embodiments, when at least one light-emitting diode included in the light strings $LS_1$~$LS_n$ (such as, the light-emitting diode $L_{22}$) is under the short-circuit failure condition, the comparator 17 outputs the determination signal $V_{DET2}$ with the high logic level In some embodiments, the determination signal $V_{DET2}$ with the high logic level indicates that at least one light-emitting diode included in the light strings $LS_1$~$LS_n$ is under the short-circuit failure condition, and the determination signal $V_{DET2}$ with the low logic level indicates that there is no short-circuit failure occurring in the light-emitting diodes $L_{11}$~$L_{nn}$. That is, the determination signal $V_{DET1}$ is configured to provide the short-circuit information about the light-emitting diodes $L_{11}$~$L_{nn}$.

In some embodiments, when the light-emitting diode $L_{22}$ is under the short-circuit failure condition, voltages at the first terminals of the diodes $D_{1B}$ and $D_{nB}$ are less than the voltages at second terminals thereof, and each of the diodes $D_{1B}$~$D_{nB}$ excluding the diode $D_{2B}$ is in the turn-off state. In some embodiments, when the light-emitting diode $L_{22}$ is under the short-circuit failure condition, a voltage at the second terminal of the diode $D_{2A}$ (the voltage $V_{S2}$ at the node $N_2$) is greater than the voltage at the first terminal thereof the diode $D_{2A}$, so that the diode $D_{2A}$ is in the turn-off state. In some embodiments, when the light-emitting diode $L_{22}$ is under the short-circuit failure condition, a voltage across two terminals of each of the diodes $D_{1B}$~$D_{nB}$ excluding the diode $D_{2B}$ remains at a certain voltage (that is, the voltage drop of the diode which is 0.7 volts, or the voltage drop of the Zener diode which is 0.1 volts), such that the voltage $V_{s\_min}$ at the inverting input terminal of the comparator 16 can be given by $[I_s"*R_S+V_{DA}]$, where the term "$V_{DA}$" indicates to a voltage drop of each of the diodes $D_{1A}$~$D_{nA}$. In some embodiments, the value of $[I_s"*R_S+V_{DA}]$ is greater than the floating voltage $V_{ref\_min}$, and the comparator 16 outputs the determination signal $V_{DET1}$ with a low logic level when the light-emitting diode $L_{22}$ is under the short-circuit failure condition. In some embodiments, when the at least one light-emitting diode (such as, the light-emitting diode $L_{22}$) included in the light strings $LS_1$~$LS_n$ is under the short-circuit failure condition, the determination signal $V_{DET2}$ output by the comparator 16 outputs the determination signal $V_{DET2}$ with the low logic level.

In some embodiments, when the light strings $LS_1$~$LS_n$ operate normally, the OR gate 18 outputs the failure determination signal $V_{DET\_OUT}$ with the low logic level according to the determination signals $V_{DET1}$ and $V_{DET2}$. On the other hand, when at least one light-emitting diode (such as, the light-emitting diode $L_{22}$) included in the light strings $LS_1$~$LS_n$ is under the short-circuit failure condition, the OR gate 18 outputs the failure determination signal $V_{DET\_OUT}$ with the high logic level according to the determination signals $V_{DET1}$ and $V_{DET2}$. In other words, whether at least one of open-circuit event or short-circuit event occurs in the light-emitting diode array ARR can be determined by the failure determination signal $V_{DET\_OUT}$ output by the OR gate 18.

Figure 2:
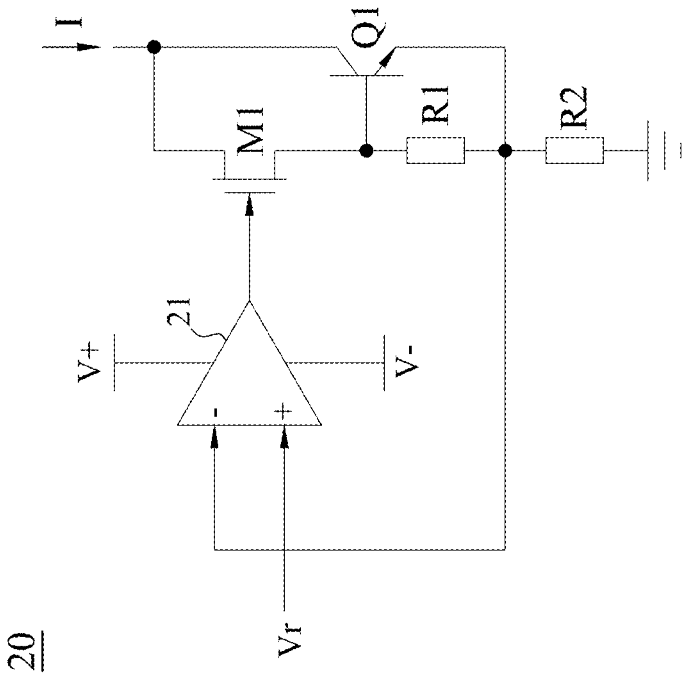
FIG. 2 shows a schematic diagram of a circuit of a constant current source according to an embodiment of the present disclosure.

A description is provided with reference to FIG. 2. FIG. 2 shows a schematic diagram of a circuit of a constant current source 20 according to an embodiment of the present disclosure. In some embodiments, the following description will be described with embodiments of the constant current source 20 composed by an operational amplifier and transistors, however, the present disclosure is not limited thereto. In the other embodiments, the constant current source 20 can be implemented by another circuit that can perform the constant current function. As shown in FIG. 2, the constant current source 20 includes an operational amplifier 21, transistors M1 and Q1, and resistors R1 and R2. In some embodiments, the operational amplifier 21 is electrically connected to a positive supply pin V+ and a negative supply pin V−. In some embodiments, an output terminal of the operational amplifier 21 is electrically connected to a gate terminal of the transistor M1, and the transistor M1 is electrically connected between a first terminal of the transistor Q1 and a gate terminal of the transistor Q1. In some embodiments, when the driving current I varies, the operational amplifier 21 adjusts an output voltage according to a reference voltage Vr and a voltage at the first terminal of the resistor R2, and the transistor M1 adjusts the voltage at the gate terminal of the transistor Q1 according to the output of the operational amplifier 21, such that the reference voltage Vr is equal to the voltage at the first terminal of the resistor R2, thereby controlling the driving current I as a constant current. In other words, the first terminal of the resistor R2 is adjusted to or determined by the reference voltage Vr through the negative feedback (virtual ground), as such the driving current I flows through the resistor R2 can be a fixed current, and this circuit becomes a constant current source.

Figure 3:
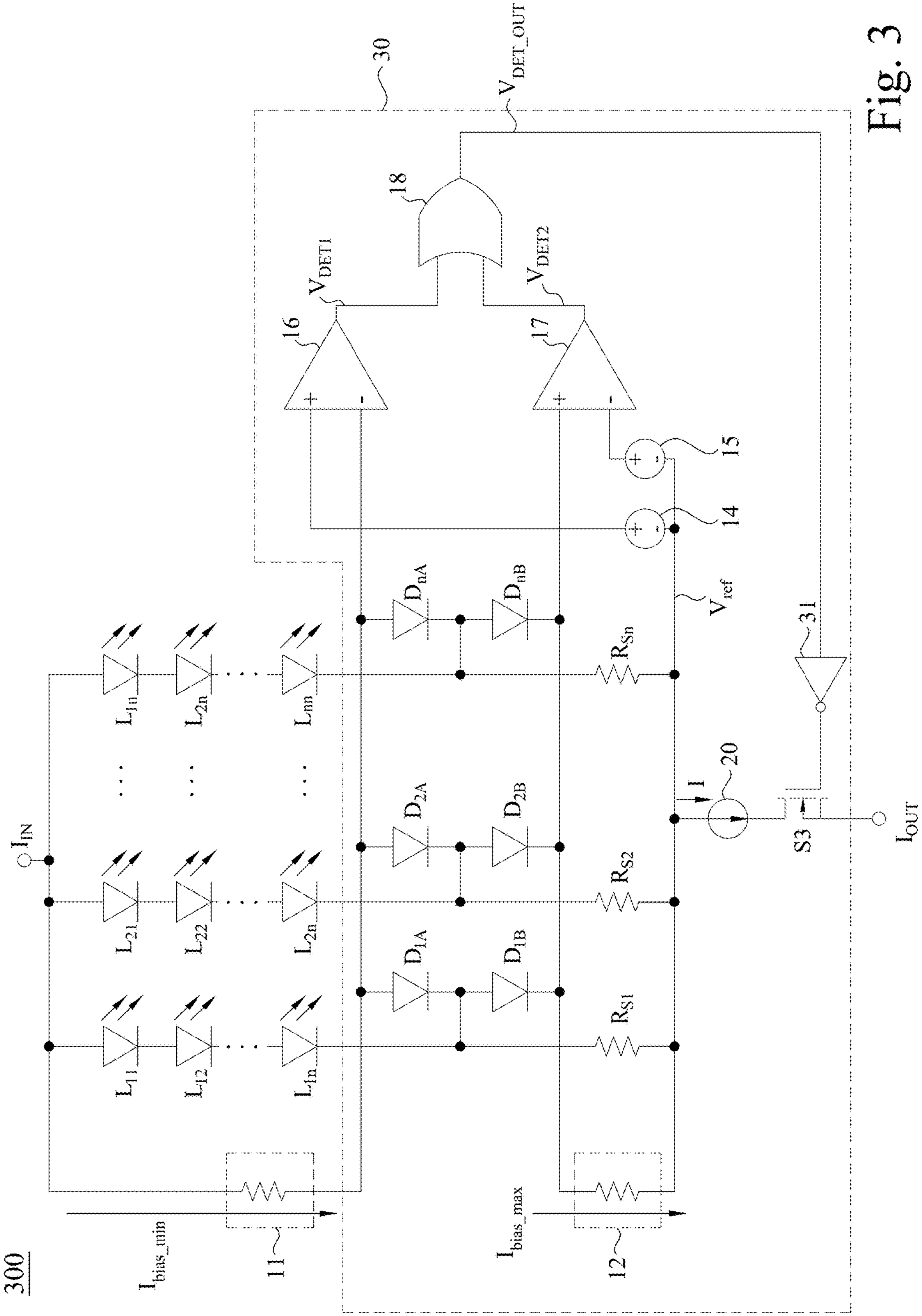
FIG. 3 shows a schematic diagram of a lighting system according to one embodiment of the present disclosure.

A description is provided with reference to FIG. 3. FIG. 3 shows a schematic diagram of a lighting system 300 according to one embodiment of the present disclosure. As shown in FIG. 3, the lighting system 300 includes light-emitting diodes $L_{11}$~$L_{nn}$ arranged in an array and a light-emitting diode driving circuit 30 electrically connected to the light-emitting diodes $L_{11}$~$L_{nn}$. In some embodiments, the light-emitting diode driving circuit 30 includes diodes $D_{1A}$~$D_{nA}$ and $D_{1B}$~$D_{nB}$, resistors $R_{S1}$~$R_{Sn}$, comparators 16 and 17, an OR gate 18, a constant current source 20, bias current sources 11 and 12, floating voltage sources 14 and 15, an inverter 31 and a switch circuit S3. In some embodiments, the output terminal of the OR gate 18 is electrically connected to a control terminal of the switch circuit S3 through the inverter 31. In some embodiments, the switch circuit S3 is electrically connected between the constant current source 20 and the second current terminal $I_{OUT}$. In some embodiments, when the OR gate 18 outputs the failure determination signal $V_{DET\_OUT}$ with the low logic level, the switch circuit S3 is turned on according to the failure determination signal $V_{DET\_OUT}$, so as to form a current path of the driving current I. On the other hand, when the OR gate 18 outputs the failure determination signal $V_{DET\_OUT}$ with the high logic level, the switch circuit S3 is turned off according to the failure determination signal $V_{DET\_OUT}$ to interrupt the current path of the driving current I, such that the light-emitting diodes $L_{11}$~$L_{nn}$ stop working.

In some embodiments, the bias current source 11 can be implemented by a resistor electrically connected to the first current terminal $I_{IN}$ and the inverting input terminal of the comparator 16 for providing a bias current $I_{bias\_min}$ to the diodes $D_{1A}$~$D_{nA}$, such that the diodes $D_{1A}$~$D_{nA}$ operate at the operating point to remain in a basic operation. In some embodiments, the bias current source 12 can be implemented by a resistor electrically connected to the second current terminal $I_{OUT}$ and the non-inverting input terminal of the comparator 17 for providing the a current $I_{bias\_max}$ to the diodes $D_{1B}$~$D_{nB}$, such that the diodes $D_{1B}$~$D_{nB}$ operate at the operating point to remain in a basic operation.

Figure 4:
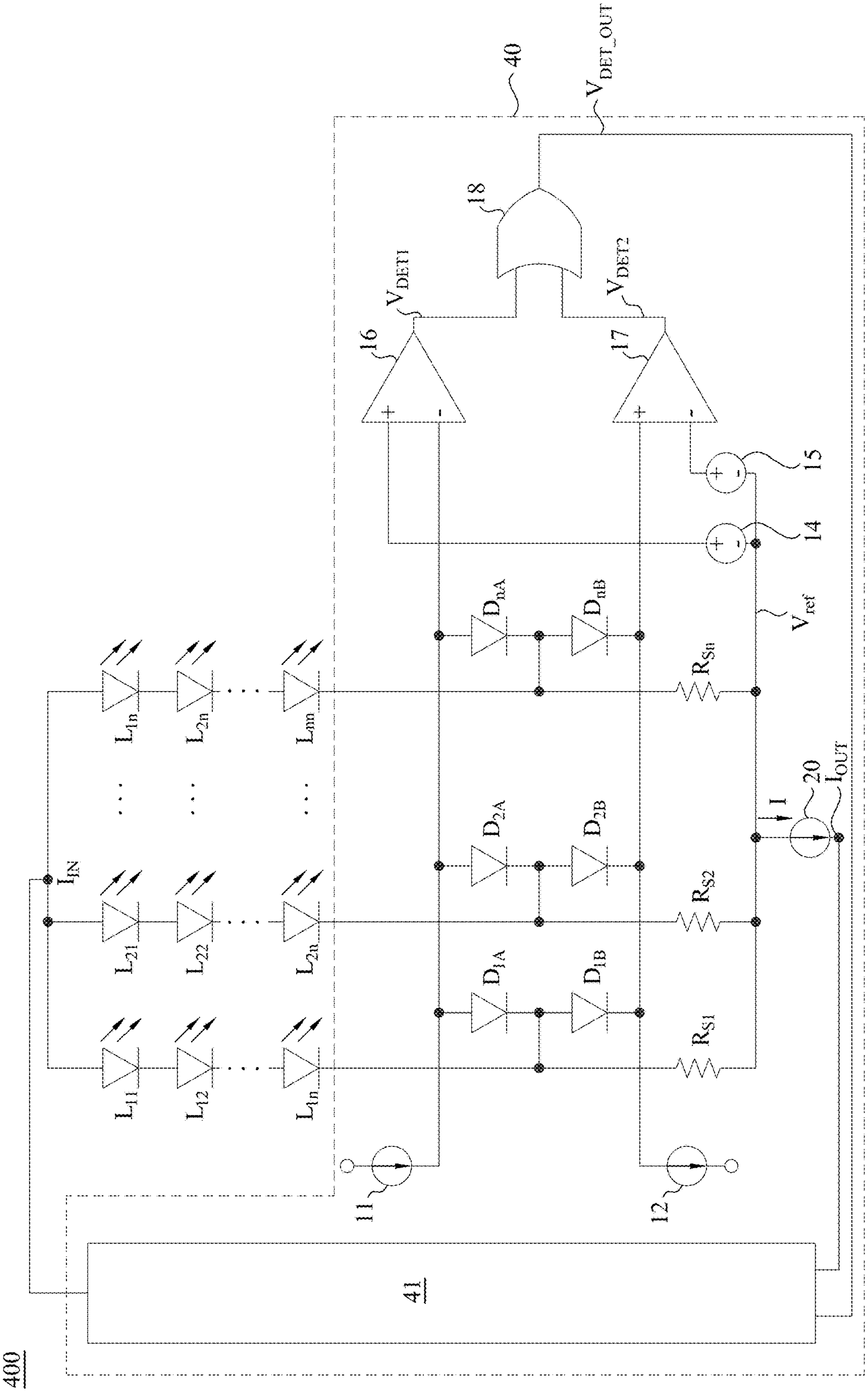
FIG. 4 shows a schematic diagram of a lighting system according to another embodiment of the present disclosure.

A description is provided with reference to FIG. 4. FIG. 4 shows a schematic diagram of a lighting system 400 according to another embodiment of the present disclosure. As shown in FIG. 4, the lighting system 400 includes a light-emitting diode driving circuit 40 and light-emitting diodes $L_{11}$~$L_{nn}$. In some embodiments, the light-emitting diode driving circuit 40 includes diodes $D_{1A}$~$D_{nA}$ and $D_{1B}$~$D_{nB}$, resistors $R_{S1}$~$R_{Sn}$, comparators 16 and 17, an OR gate 18, a constant current source 20, bias current sources 11 and 12, floating voltage sources 14 and 15 and a driver power supply 41. Compared to the light-emitting diode driving circuit 10 in FIG. 1A to FIG. 1C, the light-emitting diode driving circuit 40 in FIG. 4 further includes the driver power supply 41. In some embodiments, a first pin of the driver power supply 41 is electrically connected to the first current terminal $I_{IN}$, and a second pin of the driver power supply 41 is electrically connected to the second current terminal $I_{OUT}$. In some embodiments, a third pin of the driver power supply 41 is electrically connected to an output terminal of the OR gate 18 for adjusting the amplitude of the driving current I according to the output of the OR gate 18. In other embodiments, the third pin of the driver power supply 41 is electrically connected to the output terminal of the comparator 16 for adjusting the amplitude of the driving current I according to the output of comparator 16. In other embodiments, the third pin of the driver power supply 41 is electrically connected to the output terminal of the comparator 17 for adjusting the amplitude of the driving current I according to the output of comparator 17. In some embodiments, if the comparator 16 outputs the determination signal $V_{DET1}$ with the high logic level (which indicates that the light-emitting diode included in one of the current branches is under the open-circuit failure condition), the driver power supply 41 increases the currents flowing through elements included in the other current branches thereby accomplishing a light supplement function.

Figure 5B:
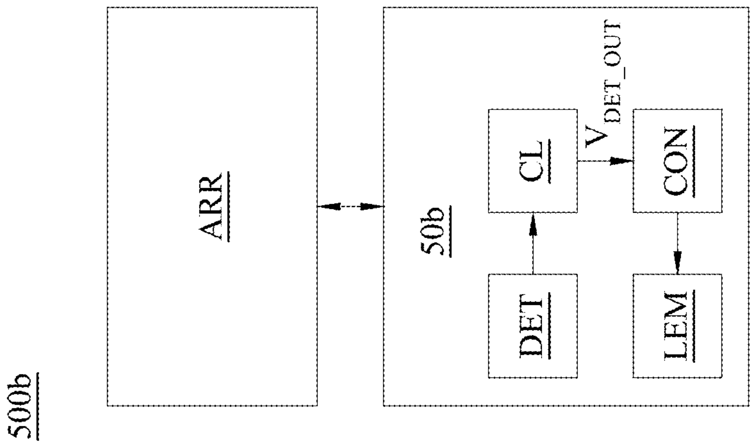
FIG. 5B shows a schematic diagram of a lighting system according to another embodiment of the present disclosure.
Figure 5A:
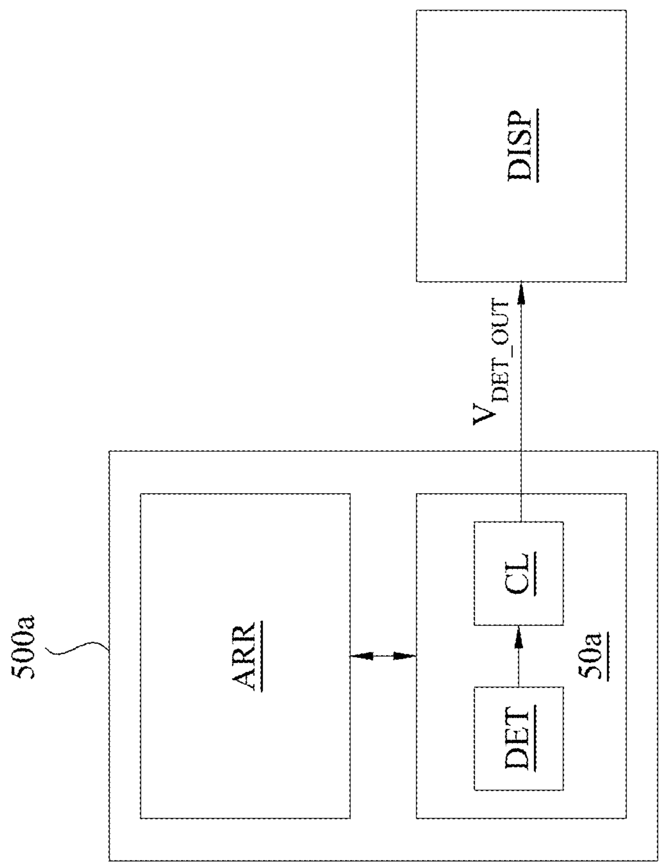
FIG. 5A shows a schematic diagram of a lighting system according to another embodiment of the present disclosure.

A description is provided with reference to FIG. 5A. FIG. 5A shows a schematic diagram of alighting system 500*a* according to another embodiment of the present disclosure. As shown in FIG. 5A, the lighting system 500*a* includes a light-emitting diode array ARR and a light-emitting diode driving circuit 50*a*. In some embodiments, the light-emitting diode driving circuit 50*a* includes a detection circuit DET and a determination circuit CL. In some embodiments, the light-emitting diode array ARR, the detection circuit DET and the determination circuit CL in FIG. 5A respectively correspond to the light-emitting diode array ARR, the detection circuit DET and the determination circuit CL in FIG. 1A, and the related description is omitted here. In some embodiments, an output terminal of the determination circuit CL is electrically connected to a display module DISP, and the display module DISP is configured to display a fault message about the light-emitting diode driving circuit 50*a* according to the failure determination signal $V_{DET\_OUT}$ output by the determination circuit CL. The fault message about the light-emitting diode driving circuit 50*a* includes a short-circuit message about light-emitting diodes, an open-circuit message about light-emitting diodes, a message about the light-emitting diode driving circuit 50*a* which have been forced to shut down, a message about the adjustment of the driving current. The above messages are taken as examples, but the present disclosure is not limited thereto.

A description is provided with reference to FIG. 5B. FIG. 5B shows a schematic diagram of alighting system 500*b* according to another embodiment of the present disclosure. As shown in FIG. 5B, the lighting system 500*b* includes a light-emitting diode array ARR and a light-emitting diode driving circuit 50*b*. In some embodiments, the light-emitting diode driving circuit 50*b* includes a detection circuit DET, a determination circuit CL, a control circuit CON and a lighting module LEM. In some embodiments, the light-emitting diode array ARR, the detection circuit DET and the determination circuit CL in FIG. 5A respectively correspond to the light-emitting diode array ARR, the detection circuit DET and the determination circuit CL in FIG. 1A, and the related description is omitted here. In some embodiments, the control circuit CON is electrically connected to the output terminal of the OR gate 18 included in the determination circuit CL for controlling the lighting module LEM to perform the light supplement function according to the failure determination signal $V_{DET\_OUT}$.

Figure 6:
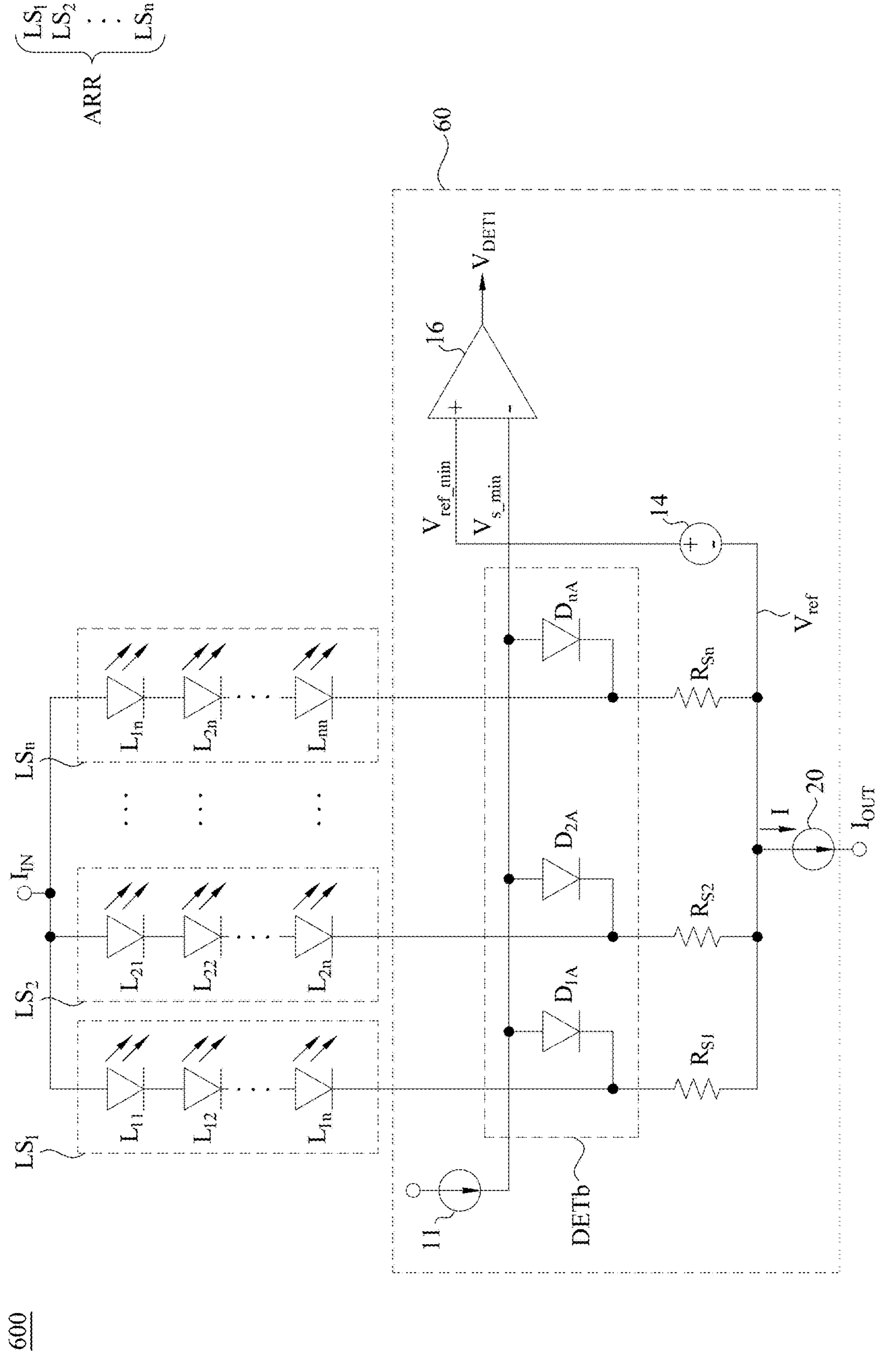
FIG. 6 shows a schematic diagram of a lighting system according to another embodiment of the present disclosure.

A description is provided with reference to FIG. 6. FIG. 6 shows a schematic diagram of a lighting system 600 according to another embodiment of the present disclosure. As shown in FIG. 6, the lighting system 600 includes light-emitting diodes $L_{11}$~$L_{nn}$ and a light-emitting diode driving circuit 60. In some embodiments, the light-emitting diode driving circuit 60 includes a detection circuit DETb, resistors $R_{S1}$~$R_{Sn}$, a comparator 16, a bias current source 11 and a floating voltage source 14. In some embodiments, the detection circuit DETb includes diodes $D_{1A}$~$D_{nA}$. In some embodiments, the detection circuit DETb included in the light-emitting diode driving circuit 60 is an open-circuit detection circuit. Compared to the light-emitting diode driving circuit 10 in FIG. 1A, the short-circuit detection architecture is not included in the light-emitting diode driving circuit 60. The light-emitting diode driving circuit 60 can normally perform the open-circuit failure detection on the light-emitting diodes $L_{11}$~$L_{nn}$, as described in detailed in the embodiment of FIG. 1B, and the related description is omitted here.

Figure 7:
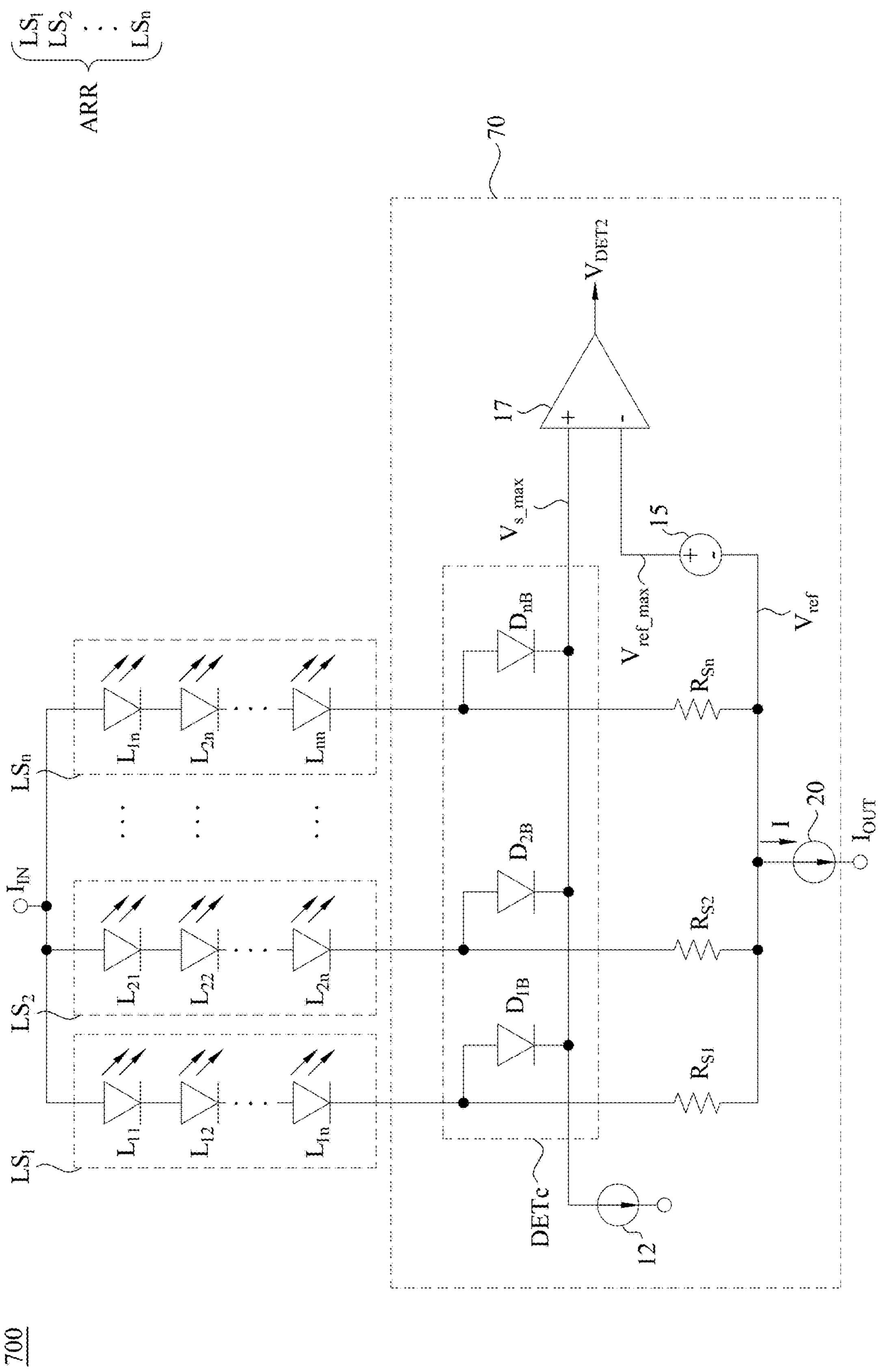
FIG. 7 shows a schematic diagram of a lighting system according to another embodiment of the present disclosure.

A description is provided with reference to FIG. 7. FIG. 7 depicts a schematic diagram of a lighting system 700 according to another embodiment of the present disclosure. As shown in FIG. 7, the lighting system 700 includes light-emitting diodes $L_{11}$~$L_{nn}$ and a light-emitting diode driving circuit 70. In some embodiments, the light-emitting diode driving circuit 70 includes a detection circuit DETc, resistors $R_{S1}$~$R_{Sn}$, a comparator 17, a bias current source 12 and a floating voltage source 15. In some embodiments, the detection circuit DETc includes diodes $D_{1B}$~$D_{nB}$. In some embodiments, the detection circuit DETc included in the light-emitting diode driving circuit 70 can be a short-circuit detection circuit. Compared to the light-emitting diode driving circuit 10 in FIG. 1A, the open-circuit detection architecture is not included in the light-emitting diode driving circuit 70. The light-emitting diode driving circuit 70 can normally perform the short-circuit failure detection on the light-emitting diodes $L_{11}$~$L_{nn}$, as described in detailed in the embodiments of FIG. 1C, and the related description is omitted here.

Figure 8:
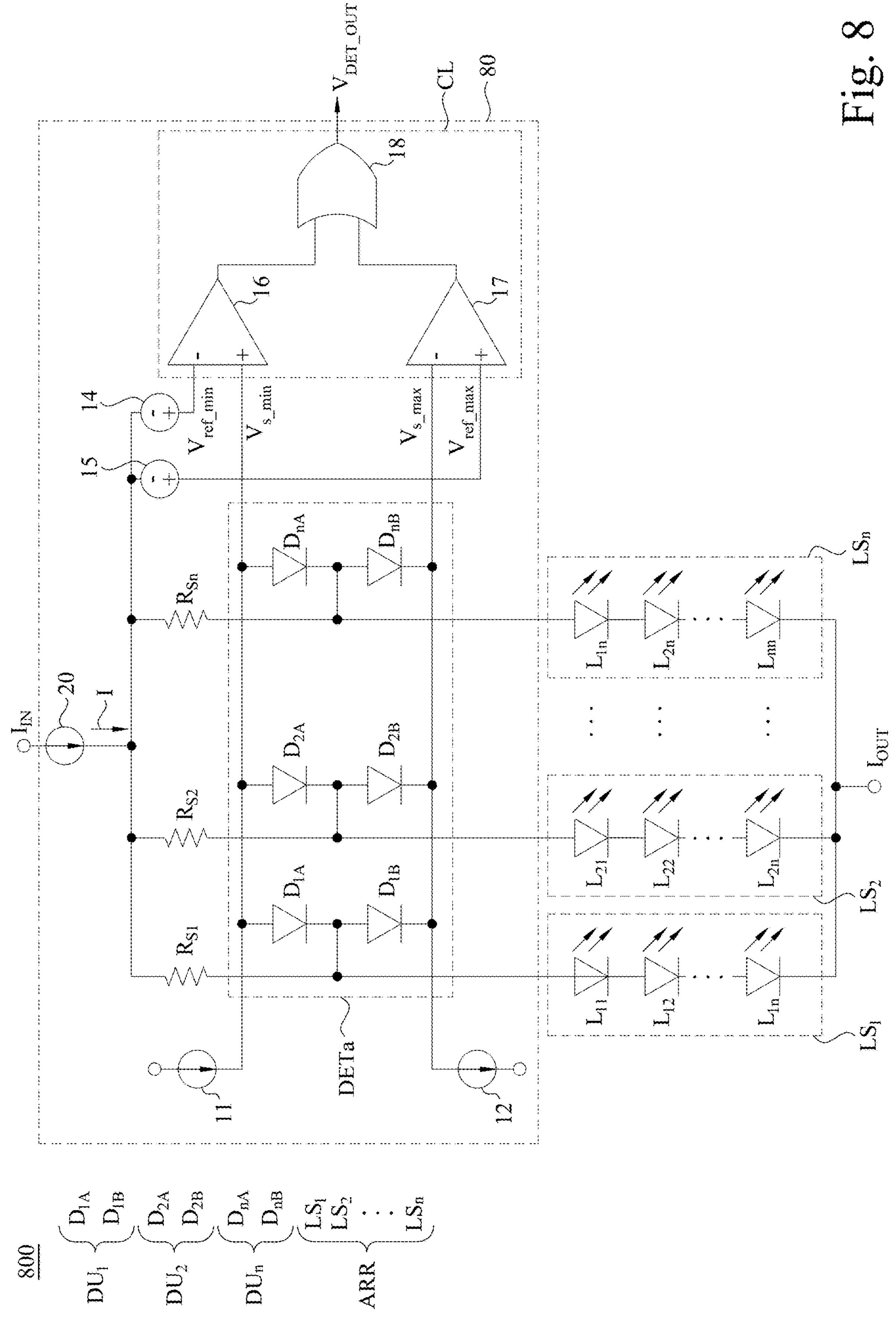
FIG. 8 shows a schematic diagram of a lighting system according to another embodiment of the present disclosure.

A description is provided with reference to FIG. 8. FIG. 8 depicts a schematic diagram of a lighting system 800 according to another embodiment of the present disclosure. As shown in FIG. 8, the lighting system 800 includes light-emitting diodes $L_{11}$~$L_{nn}$ and a light-emitting diode driving circuit 80. In some embodiments, the light-emitting diode driving circuit 80 includes a detection circuit DETa, resistors $R_{S1}$~$R_{Sn}$, bias current sources 11~12, floating voltage sources 14~15 and a determination circuit CL. In some embodiments, the operations of the detection circuit DETa, the resistors $R_{S1}$~$R_{Sn}$, the bias current sources 11~12, the floating voltage sources 14~15 and the determination circuit CL included in the light-emitting diode driving circuit 80 correspond to the operations of the detection circuit DETa, the resistors $R_{S1}$~$R_{Sn}$, bias current sources 11~12, the floating voltage sources 14~15 and the determination circuit CL in the embodiment of FIG. 1A, and the related description is omitted here. Compares to the light-emitting diode driving circuit 10 in FIG. 1A, the light-emitting diode driving circuit 80 is electrically connected between the first current terminal $I_{IN}$ and the anode terminals of the light string $LS_1$~$LS_n$. In some embodiments, based on the relationship between the voltages at the first current terminal $I_{IN}$ and the second current terminal $I_{OUT}$, the light-emitting diode driving circuit 80 is a high-voltage detection architecture configured in high voltage terminal, the connection relationship of the elements in the light-emitting diode driving circuit 80 correspond to the light-emitting diode driving circuit 10 disposed in the low voltage terminal, and the functions of light-emitting diode driving circuit 80 is the same as or similar to the functions of the light-emitting diode driving circuit 10. Therefore, the related description is omitted here.

Summary, the detection circuit DETa included in the light-emitting diode driving circuit 10 of the present disclosure can detect whether there is a failure condition occurs in the light-emitting diodes $L_{11}$~$L_{nn}$ included in multiple current branches, thereby simplifying the design of the circuit and improving the operational efficiency of the circuits.

It will be apparent to those skilled in the art that various modifications and variations can be made to the structure of the present invention without departing from the scope or spirit of the invention. In view of the foregoing, it is intended that the present invention cover modifications and variations of this invention provided they fall within the scope of the following claims.

What is claimed is:

1. A light-emitting diode driving circuit, electrically connected to a light-emitting diode array, wherein the light-emitting diode array comprises a plurality of light strings, each of the light strings comprises a plurality of light-emitting diodes, the light strings are connected to a first current terminal to receive a driving current from the first current terminal, and the light-emitting diode driving circuit comprises:

- a constant current source, electrically connected between the light strings and a second current terminal, configured to control the driving current as a constant current;
- a plurality of resistors comprising first terminals electrically connected to the light strings respectively and second terminals electrically connected a reference voltage;
- a detection circuit, electrically connected between the resistors and the light strings, comprising a plurality of diode units, wherein each of the diode units comprises a first diode and a second diode connected in series; and
- a determination circuit comprising:
  - a first comparator comprising a first first input terminal electrically connected to the first diodes, a first second input terminal configured to receive a first floating voltage, and a first output terminal configured to output a first determination signal; and
  - a second comparator comprising a second first input terminal electrically connected to the second diodes, a second second input terminal configured to receive a second floating voltage, and a second output terminal configured to output a second determination signal, wherein the first floating voltage and the second floating voltage vary with the reference voltage.

2. The light-emitting diode driving circuit as claimed in claim 1 further comprising:

- a first floating voltage source comprising a first terminal electrically connected to the first second input terminal of the first comparator and a second terminal electrically connected to the reference voltage, wherein the first floating voltage source is configured to provide the first floating voltage; and
- a second floating voltage source comprising a first terminal electrically connected to the second second input terminal of the second comparator and a second terminal electrically connected to the reference voltage, wherein the second floating voltage source is configured to provide the second floating voltage.

3. The light-emitting diode driving circuit as claimed in claim 1, wherein the first first input terminal of the first comparator is electrically connected to anode terminals of the first diodes and a first bias current source, cathode terminals of the first diodes are electrically connected to the first terminals of the resistors respectively, and the first determination signal is to provide open-circuit information about the light-emitting diodes.

4. The light-emitting diode driving circuit as claimed in claim 1, wherein the second first input terminal of the second comparator is electrically connected to cathode terminals of the second diodes and a second bias current source, anode terminals of the second diodes are electrically connected to the first terminals of the resistors respectively, and the second determination signal is to provide short-circuit information about the light-emitting diodes.

5. The light-emitting diode driving circuit as claimed in claim 1 further comprising a OR gate, electrically connected to the first output terminal of the first comparator and the second output terminal of the second comparator, wherein the OR gate is configured to generate a failure determination signal according to the first determination signal and the second determination signal.

6. The light-emitting diode driving circuit as claimed in claim 5 further comprising:

- a switch circuit, electrically connected between the constant current source and the second current terminal, wherein when the failure determination signal is at a high logic level, the switch circuit interrupts a current path of the driving current in response to the failure determination signal.

7. The light-emitting diode driving circuit as claimed in claim 5 further comprising:

- a driver power supply comprising a first pin electrically connected to the first current terminal, a second pin electrically connected to the second current terminal, and a third pin electrically connect to an output terminal of the OR gate, wherein the driver power supply is configured to provide the driving current to the light strings, and the driver power supply is further configured to adjust an amplitude of the driving current according to the failure determination signal with a high logic level.

8. The light-emitting diode driving circuit as claimed in claim 5 further comprising:

- a lighting module; and
- a control circuit electrically connected an output terminal of the OR gate and the lighting module, wherein the control circuit is configured to control the lighting module to perform a light supplement function according to the failure determination signal.

9. A light-emitting diode driving circuit, electrically connected to a light-emitting diode array, wherein the light-emitting diode array comprises a plurality of light strings, each of the light strings comprises a plurality of light-emitting diodes, the light strings are electrically connected to a first current terminal to receive a driving current from the first current terminal, and the light-emitting diode driving circuit comprises:

a constant current source, electrically connected between the light strings and a second current terminal, configured to control the driving current as a constant current;

a plurality of resistors comprising first terminals electrically connected to the light strings respectively and second terminals electrically connected to a reference voltage;

a detection circuit, electrically connected between the resistors and the light strings, comprising a plurality of diodes, wherein anode terminals of the diodes are configured to receive a bias direct current, and cathode terminals of the diodes are electrically connected to the resistors respectively; and a comparator comprising a first input terminal electrically connected to the anode terminals of the diodes, a second input terminal configured to receive a floating voltage, and an output terminal configured to output a determination signal, wherein the floating voltage varies with the reference voltage.

10. The light-emitting diode driving circuit as claimed in claim 9 further comprising:

a floating voltage source comprising a first terminal electrically connected to the second input terminal of the comparator and a second terminal electrically connected to the reference voltage, wherein the floating voltage source is configured to provide the floating voltage.

11. The light-emitting diode driving circuit as claimed in claim 9, wherein when one of the light-emitting diodes included in one of the light strings is under an open-circuit failure condition, a voltage across one of the resistors which is connected to the one of light strings is decreased, as such one of the diodes which is connected to the one of the resistors is in a turn-on state to decrease a voltage at the first input terminal of the comparator.

12. The light-emitting diode driving circuit as claimed in claim 9, wherein:

if one of the light-emitting diodes included in the light strings is under an open-circuit failure condition, the comparator outputs the determination signal a high logic level; and if the light-emitting diodes included in the light strings are under a normal operating condition, the comparator outputs the determination signal with a low logic level.

13. The light-emitting diode driving circuit as claimed in claim 9, wherein the determination signal is to provide open-circuit information about the light-emitting diodes.

14. The light-emitting diode driving circuit as claimed in claim 9, wherein the first input terminal of the comparator is electrically connected to the anode terminals of the diodes and a bias current source.

15. The light-emitting diode driving circuit as claimed in claim 14, wherein the bias current source provide a bias current to the anode terminals of the diodes.

16. A light-emitting diode driving circuit, electrically connected to a light-emitting diode array, wherein the light-emitting diode array comprises a plurality of light strings, each of the light strings comprises a plurality of light-emitting diodes, the light strings are electrically connected to a first current terminal to receive a driving current from the first current terminal, and the light-emitting diode driving circuit comprises:

a constant current source, electrically connected between the light strings and a second current terminal, configured to control the driving current as a constant current;

a plurality of resistors comprising first terminals electrically connected to the light strings respectively and second terminals electrically connected to a reference voltage;

a detection circuit, electrically connected between the resistors and the light strings, comprising a plurality of diodes, wherein cathode terminals of the diodes are configured to receive a bias direct current, and anode terminals of the diodes are electrically connected to the resistors respectively; and a comparator comprising a first input terminal electrically connected to the cathode terminals of the diodes, a second input terminal configured to receive a floating voltage, and an output terminal configured to output a determination signal, and the floating voltage varies with the reference voltage.

17. The light-emitting diode driving circuit as claimed in claim 16 further comprising:

a floating voltage source comprising a first terminal electrically connected to the second input terminal of the comparator and a second terminal electrically connected to the reference voltage, wherein the floating voltage source is configured to provide the floating voltage.

18. The light-emitting diode driving circuit as claimed in claim 16, wherein when one of the light-emitting diodes included in one of the light strings is under a short-circuit failure condition, a voltage across one of the resistors which is connected to the one of light strings is increased, as such one of the diodes which is connected to the one of the resistors is in a turn-on state to increase a voltage at the first input terminal of the comparator.

19. The light-emitting diode driving circuit as claimed in claim 16, wherein:

if one of the light-emitting diodes included in the light strings is under a short-circuit failure condition, the comparator outputs the determination signal with a high logic level; and if the light-emitting diodes included in the light strings are under a normal operating condition, the comparator outputs the determination signal with a low logic level.

20. The light-emitting diode driving circuit as claimed in claim 16, wherein the determination signal is to provide short-circuit information about the light-emitting diodes.

* * * * *